United States Patent [19]

Tesch

[11] Patent Number: 6,116,625
[45] Date of Patent: Sep. 12, 2000

[54] POTTED PLANT DOLLY

[76] Inventor: Howard L. Tesch, 306 Lakewood Dr., Luling, La. 70070

[21] Appl. No.: 09/390,755

[22] Filed: Sep. 7, 1999

[51] Int. Cl.[7] ...................................................... B62B 3/00
[52] U.S. Cl. ........................................ 280/79.11; 280/79.5
[58] Field of Search ............................. 280/47.34, 47.35, 280/79.11, 79.2, 79.5; 248/129, 131; D34/23

[56] References Cited

U.S. PATENT DOCUMENTS

| | | | |
|---|---|---|---|
| D. 221,633 | 8/1971 | Kotkowski | D34/23 |
| 253,024 | 1/1882 | Ertell | 280/79.11 |
| D. 321,965 | 11/1991 | Delmerico et al. | 280/79.5 |
| 3,302,594 | 2/1967 | Barnett et al. | 248/131 |
| 4,659,050 | 4/1987 | Tabayashi | 248/131 |
| 5,088,751 | 2/1992 | Zint | 280/47.34 |
| 5,246,239 | 9/1993 | Braden | 280/47.24 |
| 5,472,220 | 12/1995 | Stephan | 280/79.5 |
| 5,632,497 | 5/1997 | Murray | 280/47.35 |
| 5,673,928 | 10/1997 | Jury | 280/645 |
| 5,752,543 | 5/1998 | Groening | 137/312 |
| 5,881,950 | 3/1999 | Koehn | 248/131 |

FOREIGN PATENT DOCUMENTS

| | | | |
|---|---|---|---|
| 24 26 549 | 12/1974 | Germany | 280/79.11 |

*Primary Examiner*—Richard M. Camby
*Attorney, Agent, or Firm*—Henderson & Sturm LLP

[57] ABSTRACT

A potted plant dolly having a base surrounded by a molding that is raised from the surface of the base and which is filled with a silicon or other moisture proof barrier to define a cavity surrounded by the molding and partially defined by the upper surface of the base. The cavity can be filled partially with tiles which are adhesively attached to the base and then grouted in to form a concave water retaining cavity, the perimeter being defined by the molding. The base is supported on a rotary stand assembly or a wheeled chassis assembly.

1 Claim, 1 Drawing Sheet

POTTED PLANT DOLLY

BACKGROUND OF THE INVENTION

1. Field of the Invention

The present invention relates to the field of dollies, and more particularly to a dolly for supporting and transporting potted plants.

2. Description of Related Art

As can be seen by reference to the following U.S. Pat. Nos. 5,088,751; 5,246,239; 5,472,220; 5,632,497; 5,673,928; and 5,752,543, the prior art is replete with myriad and diverse dollies and carts.

While all of the aforementioned prior art constructions are more than adequate for the basic purpose and function for which they have been specifically designed, they are uniformly deficient with respect to their failure to provide a simple, efficient, and practical dolly for potted plants.

As a consequence of the foregoing situation, there has existed a longstanding need for a new and improved type of potted plant dolly, and the provision of such a construction is a stated objective of the present invention.

BRIEF SUMMARY OF THE INVENTION

Briefly stated, the present invention provides a potted plant dolly having a base surrounded by a molding that is raised from the surface of the base and which is filled with a silicon or other moisture proof barrier to define a cavity surrounded by the molding and partially defined by the upper surface of the base. The cavity can be filled partially with tiles which are adhesively attached to the base and then grouted in to form a concave water retaining cavity, the perimeter being defined by the molding. The base is supported on a rotary stand assembly or a wheeled chassis assembly.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
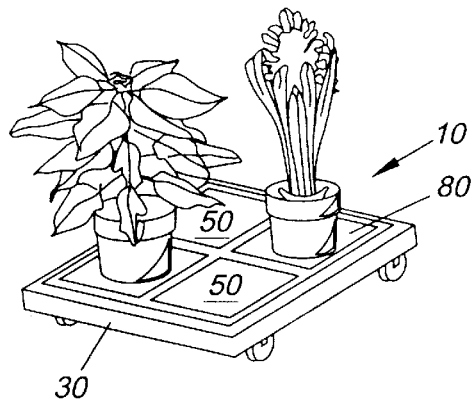
FIG. 1 is a perspective view of the potted plant dolly of the present invention.
Figure 2:
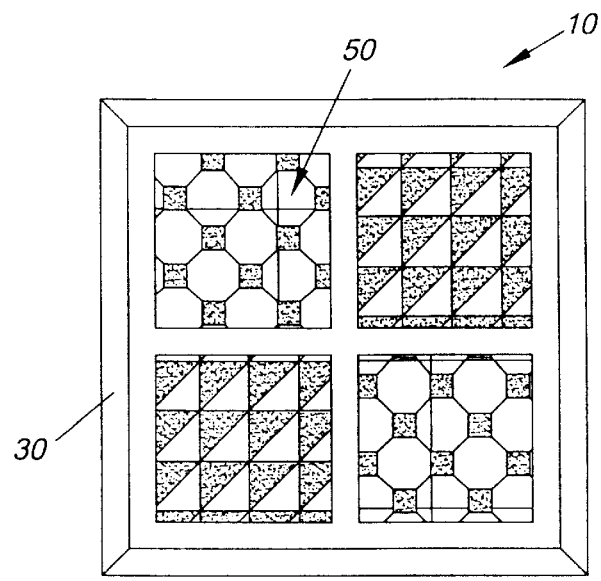
FIG. 2 is a top plan view thereof.
Figure 3:
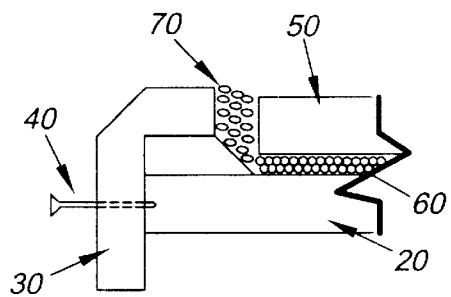
FIG. 3 is a partial sectional view showing the construction of the dolly base.
Figure 4:
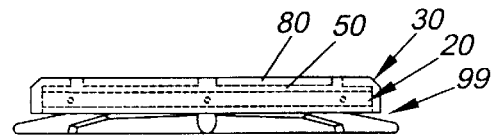
FIG. 4 is a side elevational view of the dolly mounted on a rotary stand assembly.
Figure 5:
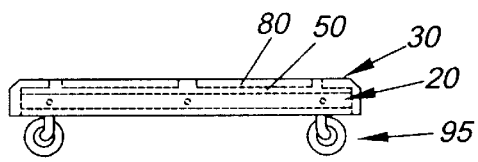
FIG. 5 is a side elevational view of the dolly with hard rubber wheels for outdoor use.
Figure 6:
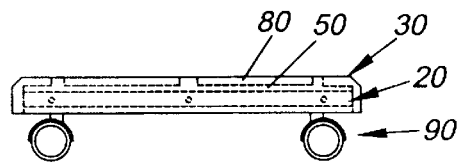
FIG. 6 is a side elevational view of the dolly with casters for indoor use.

As can be seen by reference to the drawings, and in particular to FIG. 1, the potted plant dolly that forms the basis of the present invention is designated generally by the reference number 10. The plant dolly 10 has a three-quarter inch thick plywood base 20 with decorative stained oak molding 30 attached by finish nails 40 around the perimeter. The corners of the molding 30 are mitered at 45° angles. Decorative ceramic tiles 50 are adhered to the top of the base 20 by ceramic adhesive 60 and then sealed by grout 70 so as to provide a finished central recessed cavity 80 surrounded by the raised molding 30. The underside of the base 20 has four attached casters 90 or rubber wheels 95, depending on the intended use. A rotary stand 99 could also be used to support the base 20 similar to a lazy susan. The plant dolly 10 could be square or a multi-sided octagon, pentagon, hexagon, etc. Various sizes would be available to accommodate any size plant. The tile top could be of any geometric design or color, and could be designed to match or complement existing tile surfaces in the room.

In use, the user would simply place the plant dolly 10 of their choice in the desired area, whether indoors our outdoors, and place the plant or plants onto the decorative tile surface. they would then enjoy the benefit of having an attractive, mobile stand for the plant which would not only allow them to move the plant about as required, but would also prevent possible water damage due to leakage which may occur when watering the plant. Use of the plant dolly 10 would provide a very practical and easy to use method of displaying large and possibly heavy potted plants with the ability to easily move them when desired, in a highly attractive and decorative manner.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A potted plant dolly, consisting of:

a square base having a top surface, a bottom surface, and a perimeter;

a molding attached to the base and disposed to extend entirely around the perimeter, and disposed to extend above the top surface of the base and below the bottom surface of the base, the molding including a top inside edge and a top outside edge, wherein the top outside edge is mitered at 45°;

ceramic tile attached to the top surface of the base by ceramic adhesive, the ceramic file including a top surface disposed below the top inside edge of the molding, wherein grout is disposed between the ceramic tile and the molding; and support means attached to the bottom surface of the base for allowing movement of the base, wherein the support means includes a rotary stand assembly having hard rubber wheels and casters.

* * * * *